United States Patent
Hillman

(10) Patent No.: US 11,140,865 B2
(45) Date of Patent: Oct. 12, 2021

(54) PET WASTE COLLECTION MAT

(71) Applicant: Adaine Hillman, Cincinnati, OH (US)

(72) Inventor: Adaine Hillman, Cincinnati, OH (US)

( * ) Notice: Subject to any disclaimer, the term of this patent is extended or adjusted under 35 U.S.C. 154(b) by 102 days.

(21) Appl. No.: 15/059,514

(22) Filed: Mar. 3, 2016

(65) Prior Publication Data

US 2016/0338312 A1 Nov. 24, 2016

Related U.S. Application Data

(60) Provisional application No. 62/163,665, filed on May 19, 2015.

(51) Int. Cl.
*A01K 1/015* (2006.01)
*A01K 29/00* (2006.01)
*A01G 13/02* (2006.01)
*A01G 20/20* (2018.01)

(52) U.S. Cl.
CPC ........ *A01K 1/0157* (2013.01); *A01G 13/0268* (2013.01); *A01K 29/00* (2013.01); *A01G 20/20* (2018.02)

(58) Field of Classification Search
CPC ...... A01K 1/0157; A01K 29/00; A01G 1/002; A01G 1/005; A01G 1/007; A01G 13/0268
USPC ........................................ 119/169
See application file for complete search history.

(56) References Cited

U.S. PATENT DOCUMENTS

| | | | |
|---|---|---|---|
| 4,118,892 A * | 10/1978 | Nakamura | A01G 9/025 220/23.4 |
| 6,079,363 A | 6/2000 | MacLaine | |
| 8,522,719 B2 | 9/2013 | Feld | |
| 9,750,224 B2 * | 9/2017 | Kupka | A01K 1/0107 |
| 2001/0009142 A1 * | 7/2001 | Otsuji | A01K 1/0107 119/165 |
| 2003/0094140 A1 * | 5/2003 | Otsuji | A01K 1/0107 119/169 |
| 2005/0166855 A1 * | 8/2005 | Kaneko | A01K 1/0107 119/169 |
| 2005/0284392 A1 * | 12/2005 | Hillman | A01K 1/0107 119/169 |
| 2007/0079553 A1 * | 4/2007 | Genma | A01G 9/02 47/85 |
| 2008/0072833 A1 * | 3/2008 | Meeks | A01K 1/0107 119/166 |
| 2008/0105208 A1 | 5/2008 | Hamrick | |
| 2008/0251026 A1 * | 10/2008 | Bell | A01K 1/0125 119/168 |

(Continued)

*Primary Examiner* — Brady W Frazier

(74) *Attorney, Agent, or Firm* — Dinsmore & Shohl LLP; Yongsok Choi, Esq.

(57) ABSTRACT

A pet waste collection mat for receiving a pet's waste. The pet waste collection mat is biodegradable and includes a mat having a base, one or more sidewalls, and an upper wall, defining an interior volume. The upper wall of the mat can receive pet waste thereon. Further, the upper wall includes a plurality of slots for allowing water and waste to fall onto the base. The base of the mat is impregnated with ground cover seeds so the seeds may grow upwards through the slots to conceal pet waste received on the upper wall. The pet waste collection mat further includes a plurality of interlocking connectors disposed along the periphery of the sidewalls so as to allow multiple mats to be connected to one another. Overtime, the mat and the pet waste decompose and fertilize the surrounding land.

6 Claims, 3 Drawing Sheets

(56) References Cited

U.S. PATENT DOCUMENTS

| | | | |
|---|---|---|---|
| 2009/0208674 A1* | 8/2009 | Murphy | A01G 1/002 428/17 |
| 2009/0320364 A1* | 12/2009 | MacKenzie | A01G 1/002 47/65.9 |
| 2010/0122662 A1* | 5/2010 | Kennington | A01K 1/0114 119/165 |
| 2010/0154716 A1* | 6/2010 | Smith | A01K 1/0107 119/169 |
| 2010/0170449 A1* | 7/2010 | Matsuo | A01K 1/0107 119/169 |
| 2010/0224133 A1* | 9/2010 | Hiroshima | A01K 1/0107 119/169 |
| 2010/0325975 A1* | 12/2010 | Mischo | E04D 7/005 52/173.3 |
| 2011/0030274 A1* | 2/2011 | Buist | A01G 1/007 47/65.6 |
| 2012/0006274 A1* | 1/2012 | Feld | A01K 1/0107 119/168 |
| 2012/0234253 A1* | 9/2012 | Malm | A01K 1/0107 119/169 |
| 2012/0297675 A1* | 11/2012 | Hashimoto | A01G 1/002 47/64 |
| 2012/0318687 A1* | 12/2012 | Martin | B65D 65/466 206/216 |
| 2013/0031833 A1* | 2/2013 | MacKinnon | A01G 1/007 47/65.6 |
| 2013/0167458 A1* | 7/2013 | Cerny | E04F 15/02038 52/177 |
| 2013/0239476 A1* | 9/2013 | Meyer | A01G 1/007 47/65.9 |
| 2015/0107523 A1* | 4/2015 | Nakata | A01K 1/0157 119/169 |
| 2015/0359181 A1* | 12/2015 | Yuristy | A01G 31/001 47/59 R |

\* cited by examiner

PET WASTE COLLECTION MAT

CROSS REFERENCE TO RELATED APPLICATION

This application claims the benefit of U.S. Provisional Application No. 62/163,665 filed on May 19, 2015. The above identified patent application is herein incorporated by reference in its entirety to provide continuity of disclosure.

BACKGROUND OF THE INVENTION

The present invention relates to pet waste collection devices. More specifically, the present invention provides a pet waste collection mat for concealing pet waste received thereon.

Pet owners must constantly pick up and dispose of pet waste from their pet in order to have a yard with a beautiful appearance, not littered with animal feces. Additionally, if a pile of waste sits directly upon a patch of grass or other plant, the plant may not grow in that specific area. Therefore, many pet owners use plastic bags for collecting and disposing of waste. However, such bags are not biodegradable and are added to landfills.

Furthermore, pet owners living in urban areas do not have additional garbage space for pet feces and adding such waste to a garbage container can fill a small apartment with foul odors. Thus, there exists a need for a device that is can conveniently and sustainably collect and dispose of pet waste, while also concealing the pet waste.

Devices have been disclosed in the prior art that relate to pet waste collection devices. These include devices that have been patented and published in patent application publications. These devices generally relate to a receptacle for pet waste that provides living grass, sod, or a grass-seed medium, such as U.S. Pat. No. 8,522,719, U.S. Patent Application Publication Number 2008/0251026, U.S. Pat. No. 4,800,677, and U.S. Patent Application Publication Number 2011/0139082.

These prior art devices have several known drawbacks. These devices, however, fail to include a pet waste collection mat that is impregnated with plant seeds and contain interlocking connectors disposed along the periphery thereof.

In light of the devices disclosed in the prior art, it is submitted that the present invention substantially diverges in design elements from the prior art and consequently it is clear that there is a need in the art for an improvement to existing pet waste collection devices. In this regard the instant invention substantially fulfills these needs.

SUMMARY OF THE INVENTION

In view of the foregoing disadvantages inherent in the known types of pet waste collection mats now present in the prior art, the present invention provides a new pet waste collection mat wherein the same can be utilized for providing convenience for the user when collecting and disposing of pet waste.

The pet waste collection mat is biodegradable and includes a mat having a base, one or more sidewalls, and an upper wall, defining an interior volume. The upper wall of the mat can receive pet waste thereon. Further, the upper wall includes a plurality of slots for allowing water and waste to fall onto the base. The base of the mat is impregnated with ground cover seeds so the seeds may grow upwards through the slots to conceal pet waste received on the upper wall. The pet waste collection mat further includes a plurality of interlocking connectors disposed along the periphery of the sidewalls so as to allow multiple mats to be connected to one another. Overtime, the mat and the pet waste decompose and fertilize the surrounding land.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
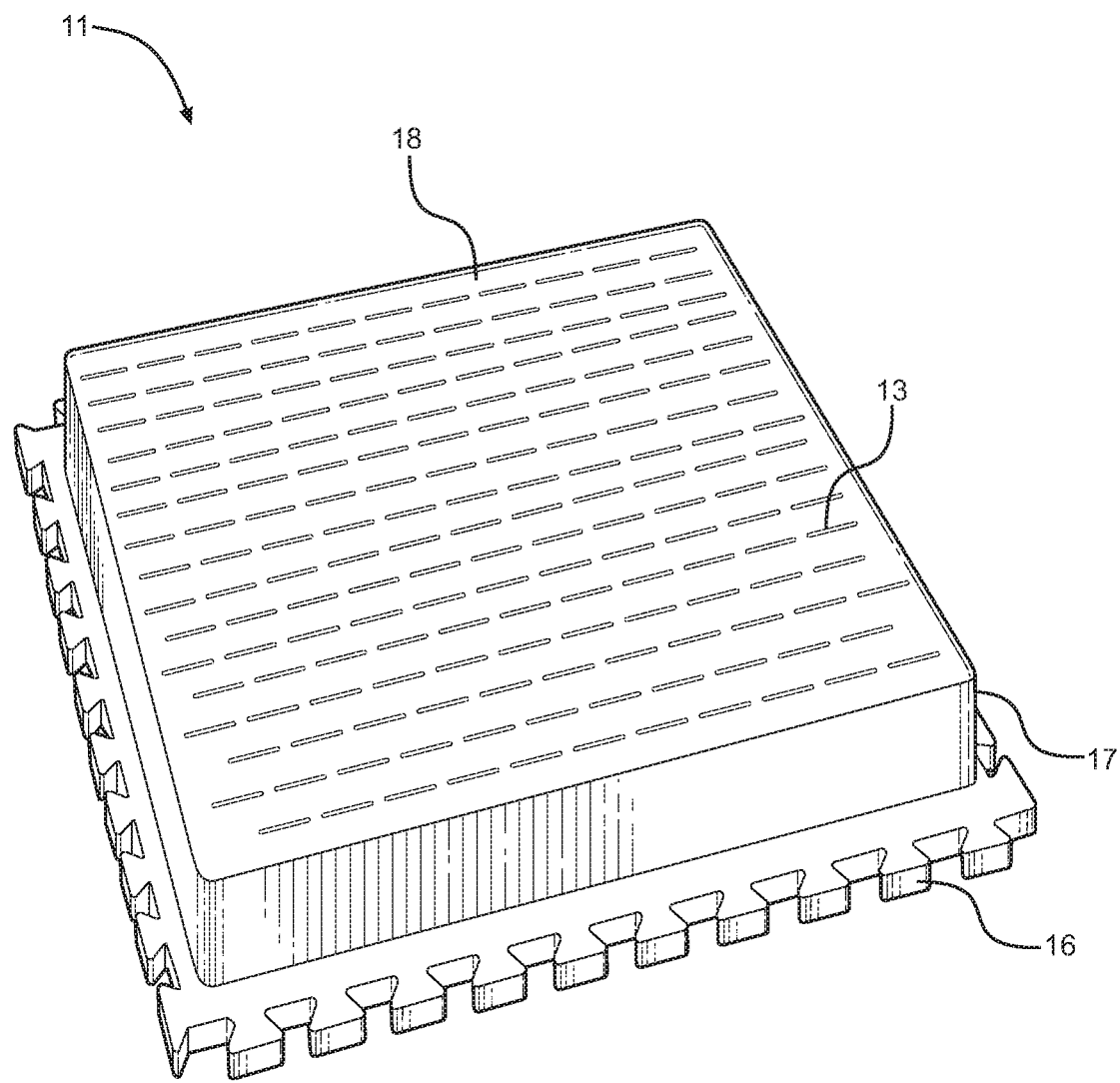
FIG. 1 shows a perspective view of the pet waste receiving mat.

Reference is made herein to the attached drawings. Like reference numerals are used throughout the drawings to depict like or similar elements of the pet waste collection mat. For the purposes of presenting a brief and clear description of the present invention, the preferred embodiment will be discussed as used for collecting and disposing of pet waste in an environmentally sustainable manner. The figures are intended for representative purposes only and should not be considered to be limiting in any respect.

Referring now to FIG. 1, there is shown a perspective view of the pet waste receiving mat. The pet waste collection mat 11 comprises a base, one or more sidewalls 17, and an upper wall 18, defining an interior volume. Preferably, the mat 11 is composed of any suitable bio-degradable material, such as polylactic acid. In the illustrated embodiment, the mat 11 comprises a cross section having a square shape, however, in alternate embodiments, the mat 11 comprises any suitable shape. The pet waste collection mat 11 is configured to be placed outdoors on a lawn or other suitable surface, wherein the upper wall 18 is adapted to receive waste from a pet thereon. Overtime, the mat 11 and the pet waste decompose and fertilize the surrounding land. However, prior to the biodegradation, the mat 11 is further configured to conceal the waste using plants to cover the upper wall 18 thereof.

A plurality of interlocking connectors 16 are disposed along the periphery of the mat 11. In the illustrated embodiment, the interlocking connectors 16 are disposed along the lower end of each sidewall 17. Preferably, the interlocking connectors 16 comprise a jigsaw pattern configured to interlock with another mat having substantially the same jigsaw pattern. Thus, the pet waste collection mat 11 can be modular via the interlocking connectors 16 so as to allow multiple mats to be connected to one another in order to form a desired size and shape.

The upper wall 18 of the mat 11 includes a plurality of slots 13 or apertures thereon, wherein the slots 13 allow growing plants to pass therethrough. In the illustrated embodiment, the slots 13 are disposed along the length of the mat 11 at a fixed distance apart from one another. Further, the slots 13 allow sunlight, water from rain, sprinklers, etc., and waste to pass therethrough and onto the base of the mat 11. In alternate embodiments, the slots 13 can comprise any suitable configuration that enable sunlight, water, waste, and plants to pass therethrough.

Figure 2:
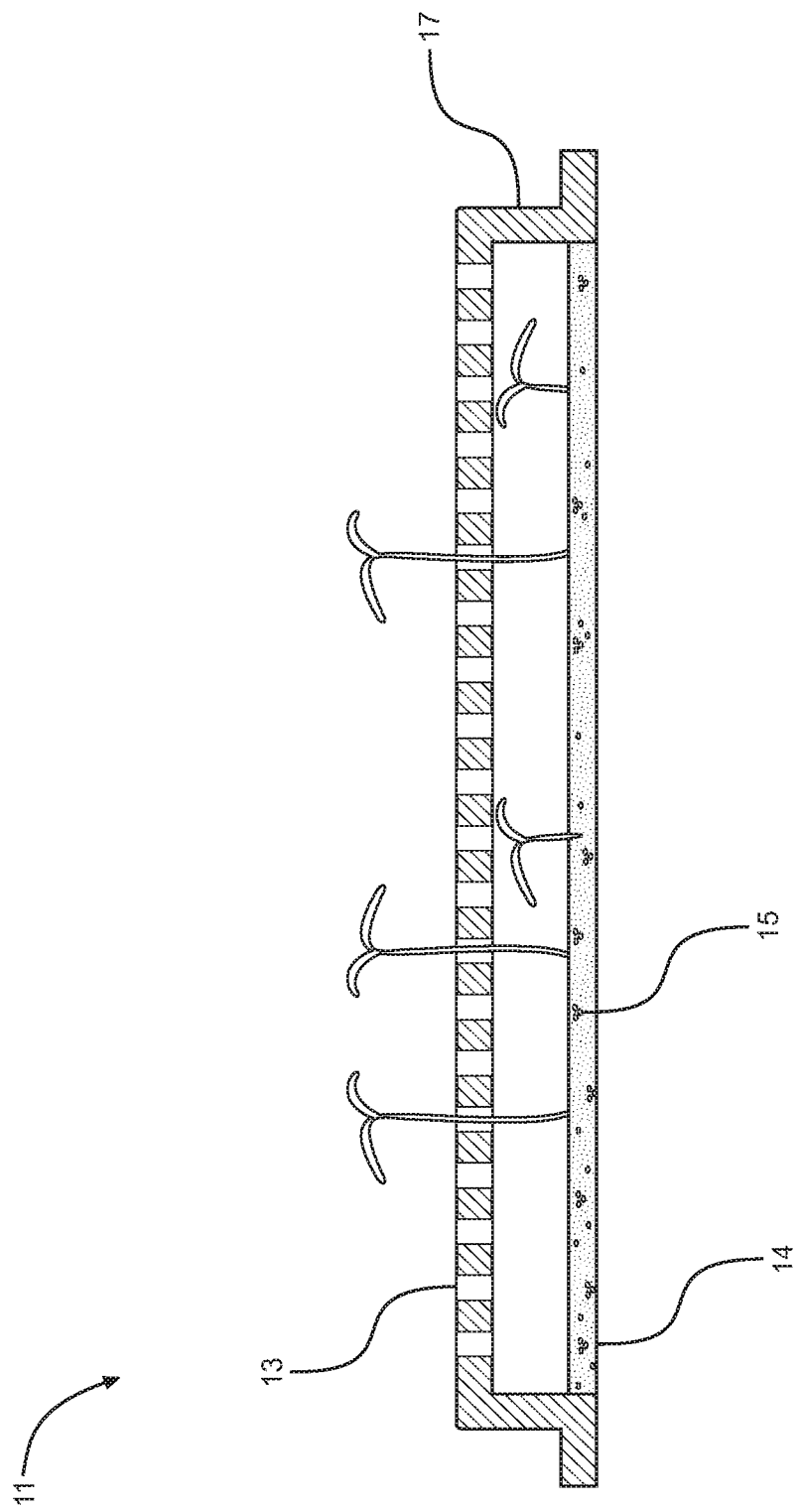
FIG. 2 shows a cross sectional view of the pet waste receiving mat.

Referring now to FIG. 2, there is shown a cross sectional view of the pet waste receiving mat. The pet waste receiving mat 11 further comprises a matrix having a plurality of seeds dispersed therein. Preferably, the matrix is disposed within the interior volume of the mat 11. In the illustrated embodiment, the matrix comprises the base 14 of the mat 11 impregnated with seeds 15. The seeds 15 are configured to grow upwards from the base 14 and through the slots 13 of the mat 11 in order to conceal pet waste received on the upper wall. The base 14 is composed of any suitable bio-degradable material, such as paper impregnated with ground cover seeds. The seeds 15 are configured to grow with the addition of sunlight and water received through the slots 13 of the mat 11. Further, as waste particles pass through the slots 13, the seeds 15 become fertilized so as to help them grow. In the illustrated embodiment, the base 14 is secured to the sidewalls 17 of the mat 11 by a fastener, such as adhesive. In some embodiments, the base 14 is integral to the sidewalls 17 of the mat 11.

Figure 3:
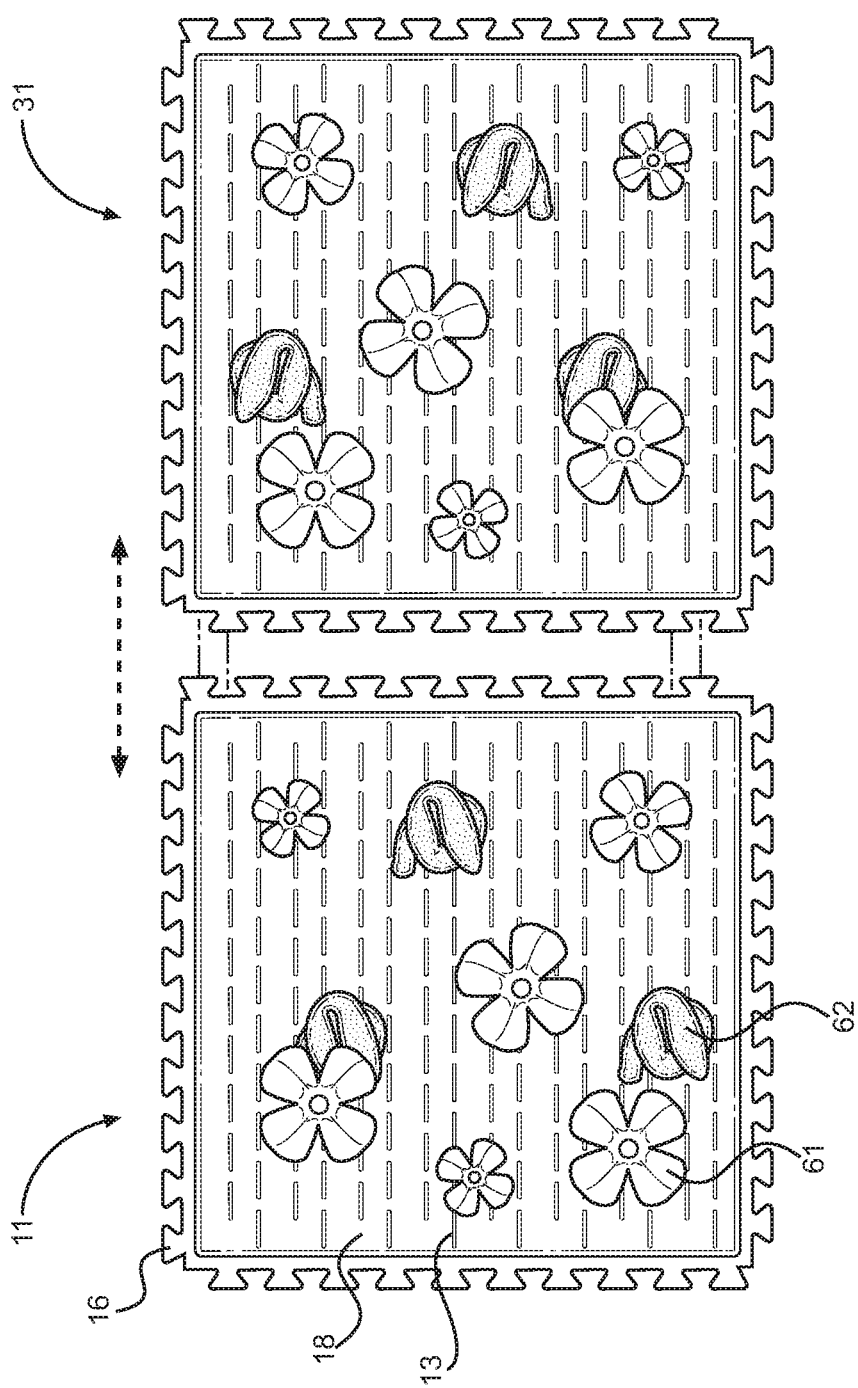
FIG. 3 shows a plan view of multiple pet waste receiving mats in use.

Referring now to FIG. 3, there is shown a plan view of multiple pet waste receiving mats in use. In operation, first a pet waste collecting mat 11 is placed outdoors on the ground, preferably on a lawn or similar surface. One or more additional pet waste collecting mats 31 having substantially similar interconnecting connectors 16 as the pet waste collecting mat 11 can be secured to the first pet waste collecting mat 11 via the interlocking connectors 16. The interlocking connectors on the first mat 11 are aligned with the additional mat 31 so as to interlock with one another. A user can train his or her pet to defecate on the upper wall 18 of the mats. Water from rain and the like, along with sunshine, pass through the slots 13 and onto the base of the mat, where the seeds are located. The seeds grow upwards through the slots 13 and into plants 61 having leaves or flowers used to conceal the waste 62. Overtime, the pet waste collecting mats 11, 31 and the pet waste 62 decompose and fertilize the surrounding land.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet waste collection mat, comprising:
   a base, an upper wall, and a plurality of sidewalls, defining a hollow interior volume configured to receive a pet waste, wherein the upper wall is a flat plate parallel to the base and the base is impregnated with a plurality of seeds;
   a plurality of slots for receiving growing plants therethrough, the plurality of slots disposed on the upper wall of the mat;
   a plurality of interlocking connectors extended horizontally from a bottom of the plurality of sidewalls of the mat,
   wherein the flat plate includes an upper flat surface and a lower flat surface and each of the slots extends vertically from the upper flat surface to the lower flat surface; and
   wherein the base is fastened to interior surfaces of the plurality of sidewalls.

2. The pet waste collection mat of claim 1, wherein the pet waste collection mat comprises a cross section square in shape.

3. The pet waste collection mat of claim 1, wherein the plurality of seeds are ground cover seeds.

4. The pet waste collection mat of claim 1, wherein the pet waste collection mat is composed of bio-degradable material.

5. The pet waste collection mat of claim 1, wherein the base is composed of paper impregnated with seeds.

6. The pet waste collection mat of claim 1,
   wherein the plurality of interlocking connectors comprise a jigsaw pattern.

* * * * *